(12) United States Patent
Adeyshvili et al.

(10) Patent No.: US 11,340,496 B2
(45) Date of Patent: May 24, 2022

(54) HEAD-UP DISPLAY WITH LOCAL DIMMING

(71) Applicant: DENSO International America, Inc., Southfield, MI (US)

(72) Inventors: Olga Adeyshvili, Novi, MI (US); Reben Werman, Sterling Heights, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/913,028

(22) Filed: Jun. 26, 2020

(65) Prior Publication Data

US 2021/0405450 A1    Dec. 30, 2021

(51) Int. Cl.
*G02B 27/01* (2006.01)
*G02F 1/13357* (2006.01)
*G02F 1/1335* (2006.01)

(52) U.S. Cl.
CPC ... *G02F 1/133606* (2013.01); *G02B 27/0101* (2013.01); *G02F 1/133603* (2013.01); *G02B 2027/0118* (2013.01); *G02F 1/133607* (2021.01)

(58) Field of Classification Search
CPC ......... G02F 1/133606; G02F 1/133607; G02B 27/01
See application file for complete search history.

(56) References Cited

U.S. PATENT DOCUMENTS

| | | | |
|---|---|---|---|
| 8,350,800 B2 | 1/2013 | An et al. | |
| 8,766,904 B2 | 7/2014 | Neal | |
| 8,866,168 B2 | 10/2014 | Bailey et al. | |
| 9,303,845 B2 | 4/2016 | Jeong et al. | |
| 10,254,584 B2 | 4/2019 | Omanovic et al. | |
| 2013/0033849 A1 | 2/2013 | Roberts et al. | |
| 2013/0100524 A1* | 4/2013 | Magarill | G02B 17/08 359/365 |
| 2015/0219306 A1* | 8/2015 | Lee | G02B 19/0066 362/97.3 |
| 2019/0265472 A1* | 8/2019 | Sugiyama | G02B 6/0016 |

* cited by examiner

*Primary Examiner* — Kevin M Nguyen

(74) *Attorney, Agent, or Firm* — Harness, Dickey & Pierce, P.L.C.

(57) ABSTRACT

A head-up display assembly including a printed circuit board with a plurality of light emitting elements. A display is illuminated by the plurality of light emitting elements. A biconic lens array is between the printed circuit board and the display. The biconic lens array includes a plurality of biconic lenses. Each one of the plurality of biconic lenses is aligned with a different one of the plurality of light emitting elements. Light emitted by the plurality of light emitting elements passes through the plurality of biconic lenses and illuminates the display.

20 Claims, 3 Drawing Sheets

HEAD-UP DISPLAY WITH LOCAL DIMMING

FIELD

The present disclosure relates to a head-up display, such as for a vehicle.

BACKGROUND

This section provides background information related to the present disclosure, which is not necessarily prior art.

A head-up display, also known as a HUD, is a transparent display that presents data without requiring users to look away from their usual viewpoints. The origin of the name stems from an operator of a vehicle being able to view information with the head positioned "up" and looking forward, instead of angled down looking at lower instruments. A HUD also has the advantage that the operator's eyes do not need to refocus to view the outside after looking at the optically nearer instruments. While current HUDs are suitable for their intended use, they are subject to improvement. For example, a HUD that consumes relatively less energy and provides improved clarity as compared to existing HUDs would be desirable. The present disclosure includes an improved HUD having numerous advantages and unexpected results, as explained in detail herein and as one skilled in the art will appreciate.

SUMMARY

This section provides a general summary of the disclosure, and is not a comprehensive disclosure of its full scope or all of its features.

The present disclosure provides for a head-up display assembly including a printed circuit board with a plurality of light emitting elements. A display is illuminated by the plurality of light emitting elements. A biconic lens array is between the printed circuit board and the display. The biconic lens array includes a plurality of biconic lenses. Each one of the plurality of biconic lenses is aligned with a different one of the plurality of light emitting elements. Light emitted by the plurality of light emitting elements passes through the plurality of biconic lenses and illuminates the display.

The present disclosure further provides for a head-up display assembly including a printed circuit board having a plurality of light emitting elements. A display is illuminated by the plurality of light emitting elements. A biconic lens array is between the printed circuit board and the display. The biconic lens array includes a plurality of biconic lenses. Each one of the plurality of biconic lenses is aligned with a different one of the plurality of light emitting elements. Light emitted by the plurality of light emitting elements passes through the plurality of biconic lenses and illuminates the display. Each one of the biconic lenses has a first aspheric portion including a first outer convex surface facing the printed circuit board, a second aspheric portion including a second outer convex surface facing the display, and a hollow core between the first aspheric portion and the second aspheric portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
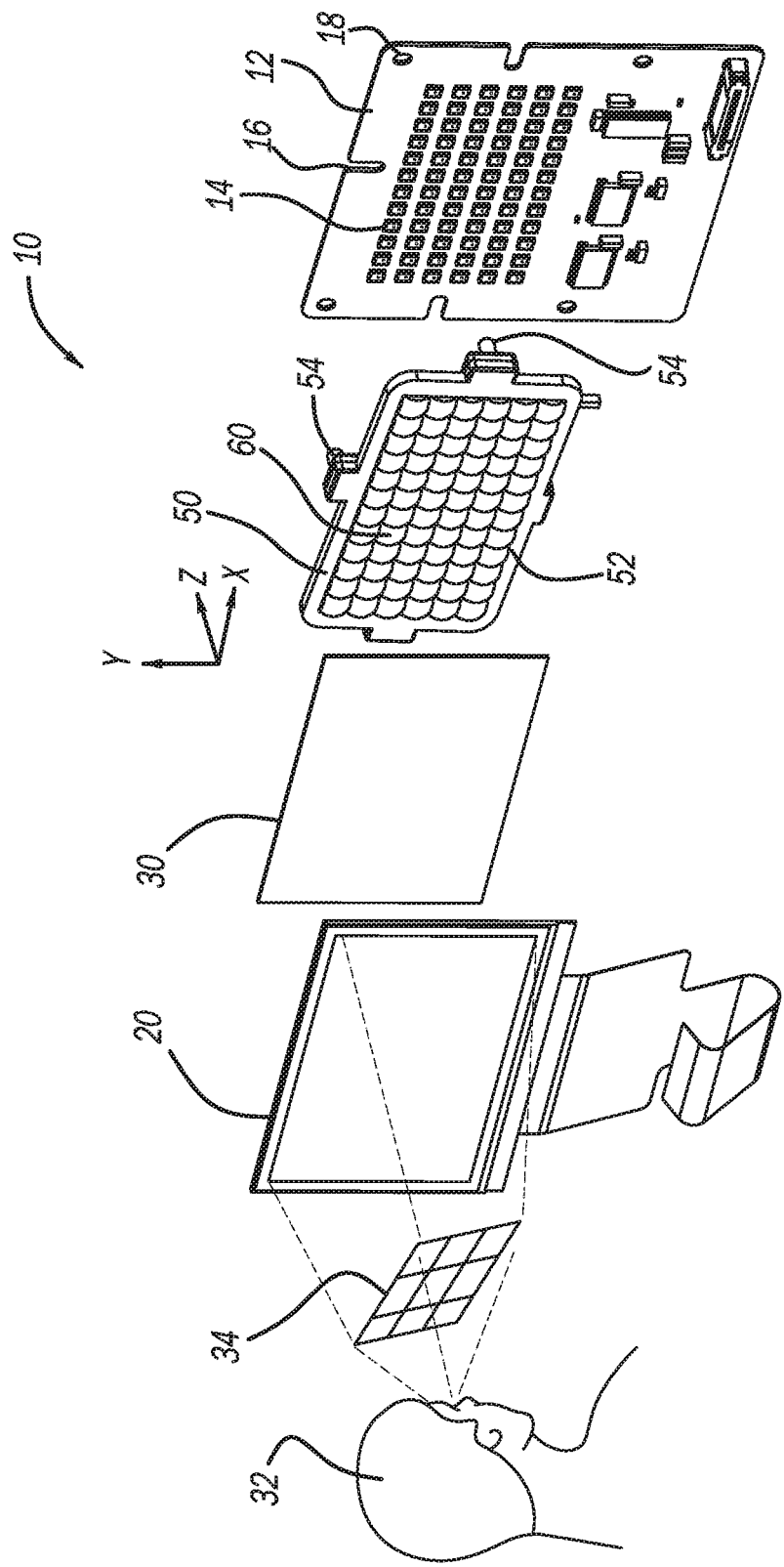
FIG. 1 is an exploded view of a head-up display assembly in accordance with the present disclosure.
Figure 2A:
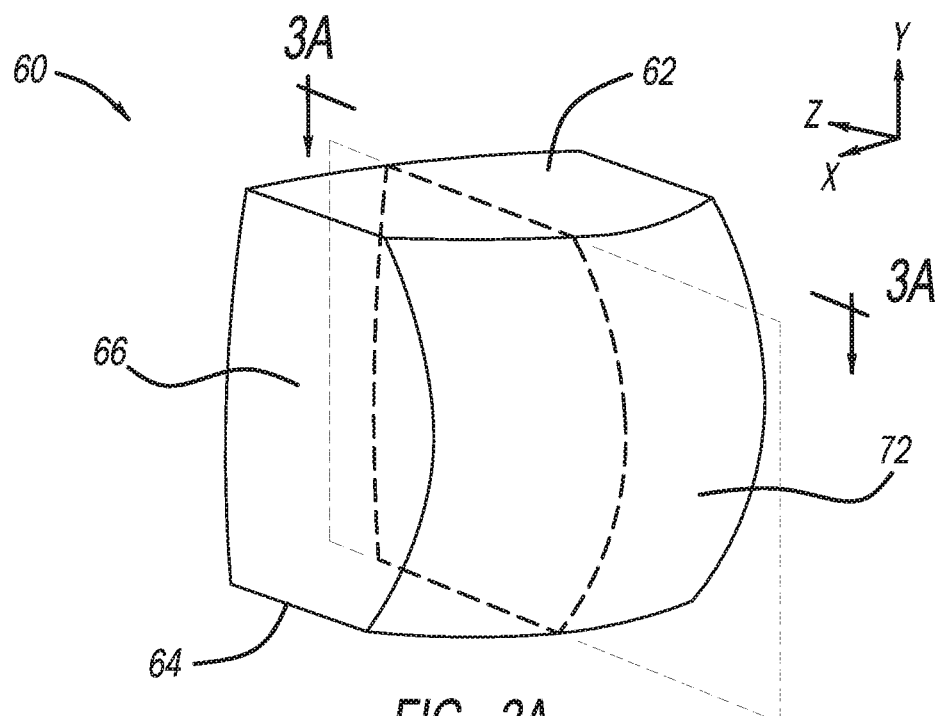
FIG. 2A is a first perspective view of an exemplary biconic lens of the head-up display of FIG. 1.
Figure 2B:
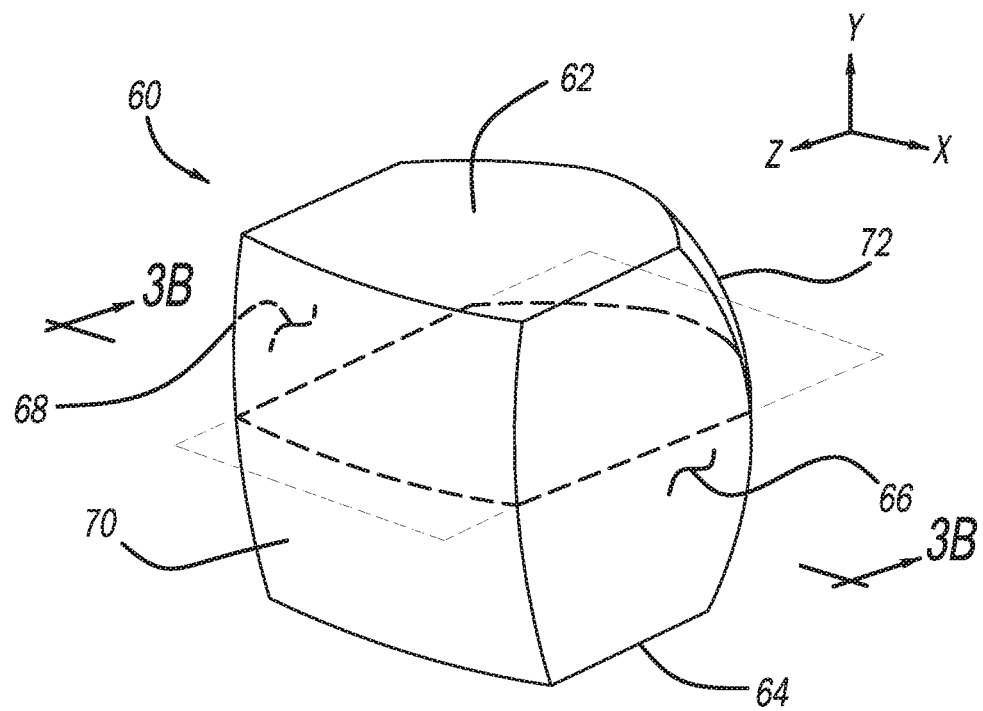
FIG. 2B is a second perspective view of the exemplary biconic lens.

With initial reference to FIG. 1, a head-up display (HUD) assembly in accordance with the present disclosure is generally illustrated at reference numeral 10. The HUD assembly 10 includes a printed circuit board (PCB) 12 having a plurality of light emitting elements. Any suitable light emitting elements can be included, such as light emitting diodes (LED) 14. The LEDs 14 illuminate a display element 20. The display element 20 may be any suitable display, such as a liquid-crystal display. Any suitable liquid-crystal display may be included, such as a thin-film-transistor liquid-crystal display. Light from the LEDs 14 is directed to the display element 20 by biconic lens array 50 in accordance with the present disclosure. Any suitable light diffuser 30 may be arranged between the biconic lens array 50 and the display element 20.

The HUD assembly 10 may be configured for use with any suitable vehicular or non-vehicular application to convey information to a viewer 32. With respect to vehicular applications, the HUD assembly 10 may be configured to display information in a line of sight of the viewer 32 by way of an eyebox 34 generated by the display element 20 to enhance safe operation of the vehicle. Any suitable information may be displayed by the HUD assembly 10, such as, but not limited to, the following: current vehicle speed; road speed limit; engine speed limit; navigational commands; vehicle heading; and entertainment system information (e.g., current radio station, selected podcast, etc.). The HUD assembly 10 may also be adapted for use in any suitable non-vehicular application, such as aircraft applications, watercraft applications, military applications, etc.

The biconic lens array 50 includes a plurality of lenses 60. A frame 52 surrounds the biconic lenses 60. The frame 52 includes any suitable mounting members 54 for mounting the frame 52 to any suitable surface, such as to a housing of the HUD assembly 10, the PCB 12, or any suitable surface behind the PCB 12. The PCB 12 may define slats 16 through which the mounting members 54 may extend. The biconic lens array 50 is mounted such that each one of the biconic lenses 60 is aligned with a different one of the LEDs 14, and such that a small gap is present between the biconic lens array 50 and the PCB 12. The mounting members 54 may also serve as locators, or the frame 52 may include separate locators that cooperate with openings 18 of the PCB 12, to facilitate alignment of the biconic lenses 60 with the LEDs 14.

Any suitable number of biconic lens 60 may be included. The following examples of the number, arrangement, and configuration of the biconic lenses 60 and the LEDs 14 is not limiting, and various other arrangements and configurations may be utilized. The number of biconic lenses 60 may correspond to the number of LEDs 14, but any other suitable number of biconic lenses 60 and LEDs 14 may be included. For example, the HUD assembly 10 may include 50 biconic lenses 60 and 50 LEDs 14. The LEDs 14 may be separated at any suitable pitch, which is the distance between adjacent LEDs 14. For example, the LEDs may be arranged at a pitch of 6.8 mm. The 50 biconic lens 60 and the 50 LEDs 14 may both be arranged in arrays of 5×10. In some applications, the HUD assembly 10 may include 72 biconic lenses 60 and 72 LEDs 14, which may be arranged at a pitch of 5.6 mm. The 72 biconic lenses 60 and the 72 LEDs 14 may both be arranged in arrays of 6×12. The number of biconic lenses 60, the number of LED's 14, and the pitch typically depends on the size of the display element 20 and the size of the LED's 14.

With additional reference to FIGS. 2A-3B, an exemplary one of the biconic lenses 60 will now be described in detail. The biconic lenses 60 may be the same or substantially similar, or may be different. The biconic lenses 60 may have a square or rectangular shape and four aspheric radii, as explained herein. The rectangular shape advantageously reduces the occurrence of light bleed from one biconic lens 60 to another biconic lens 60, which sometimes occurs with circular-shaped biconic lenses. The biconic lenses 60 each include an upper surface 62, a lower surface 64, a first side surface 66, a second side surface 68, a first aspheric outer surface 70, and a second aspheric outer surface 72.

Figure 3A:
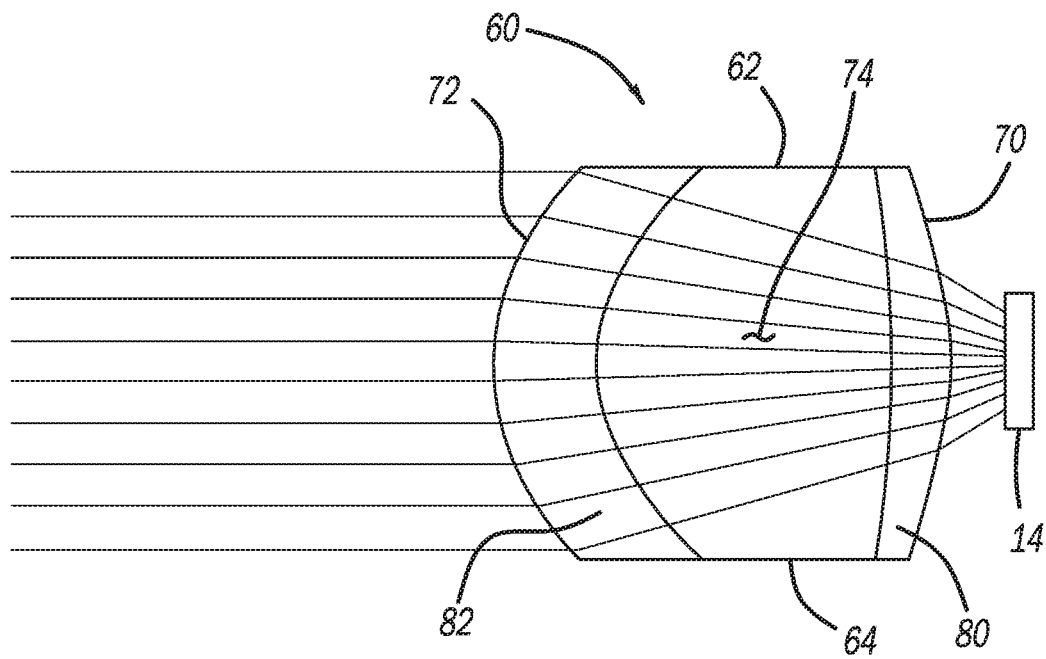
FIG. 3A is a first cross-sectional view of the exemplary biconic lens taken along line 3A-3A of FIG. 2A.
Figure 3B:
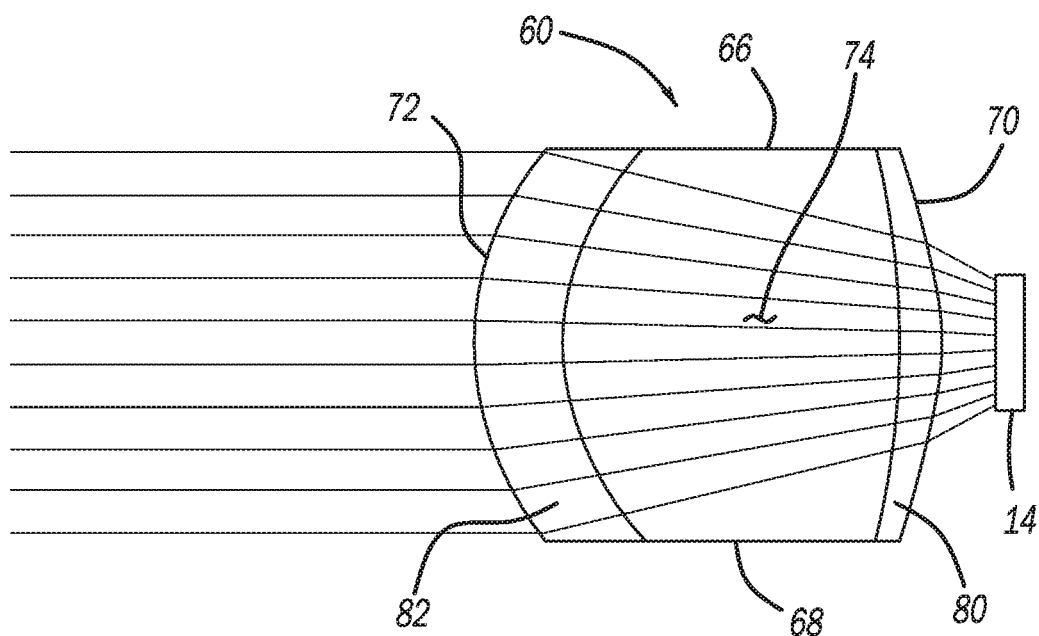
FIG. 3B is a second cross-sectional view of the exemplary biconic lens taken along line 3B-3B of FIG. 2B.

With particular reference to FIGS. 3A and 3B, which are cross-sectional views of the biconic lens 60 taken at 90° relative to each other, the first aspheric outer surface 70 is a convex outer surface of a first aspheric portion 80. The second aspheric outer surface 72 is a convex outer surface of a second aspheric portion 82. The first aspheric portion 80, the second aspheric portion 82, the upper surface 62, the lower surface 64, the first side surface 66, and the second side surface 68 define a hollow core 74 of the biconic lens 60.

The biconic lens 60 is arranged such that the first aspheric outer surface 70 faces the printed circuit board 12, and specifically the LED 14 that the particular biconic lens 60 is aligned with. The second aspheric outer surface 72 faces the display element 20. Thus, light generated by the particular LED 14 that the biconic lens 60 is aligned with passes through the first aspheric portion 80 into the hollow core 74, and exits the biconic lens 60 through the second aspheric portion 82.

The first aspheric portion 80 has a maximum thickness that is less than a maximum thickness of the second aspheric portion 82. The first aspheric outer surface 70 has a first radius of curvature that is greater than a second radius of curvature of the second outer surface 72. The size and shape of each one of the first aspheric portion 80 and the second aspheric portion 82 may be customized to optimize the biconic lens 60 to provide desired performance. Thus, the biconic lenses 60 have four aspheric radii that may be customized. For example, the radius of curvature of the first outer surface 70 may be customized along the X-axis and/or the Y-axis, and the thickness of the first aspheric portion 80 may be customized. The radius of curvature of the second outer surface 72 may also be customized along the X-axis and/or the Y-axis, and the thickness of the second aspheric portion 82 may also be customized. Distance between the first aspheric portion 80 and the second aspheric portion 82 may also be customized. Customizing the radius of curvature of the first and second outer surfaces 70, 72, customizing the thickness of the first and second aspheric portions 80, 82, and/or customizing the distance between the first and second aspheric portions 80, 82 advantageously provides control over the aspheric constant of the plurality of lenses 60, which improves light collimation through the HUD assembly 10, which results in improved image clarity at the eyebox 34. The present disclosure advantageously provides for a HUD assembly 10 configured to provide local dimming to improve contrast of the display element 20 and reduce power consumption of the HUD assembly 10 by dimming, or turning off, the LEDs 14 corresponding to areas of the display element 20 displaying black. Thus, each LED 14 may be controlled individually so if a particular region of the display element 20 does not need to be illuminated, then the corresponding LED(s) 14 may remain off. Because each one of LEDs 14 is assigned to a set region of the display element 20, the intensity of the LEDs 14 may be set to a maximum intensity level for the particular region of the display element 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A head-up display assembly comprising:
   a printed circuit board including a plurality of light emitting elements;
   a display illuminated by the plurality of light emitting elements;
   a biconic lens array between the printed circuit board and the display, the biconic lens array including a plurality of biconic lenses, each one of the plurality of biconic lenses is aligned with a different one of the plurality of light emitting elements, light emitted by the plurality of light emitting elements passes through the plurality of biconic lenses and illuminates the display; and
   wherein each one of the plurality of biconic lenses includes a first aspheric outer surface and a second aspheric outer surface that is opposite to the first aspheric surface.

2. The head-up display assembly of claim 1, wherein the plurality of biconic lenses are rectangular.

3. The head-up display assembly of claim 1, wherein each one of the plurality of biconic lenses includes six sides.

4. The head-up display assembly of claim 3, wherein at least two of the six sides are curved.

5. The head-up display assembly of claim 1, wherein the first aspheric outer surface is convex.

6. The head-up display assembly of claim 5, wherein the second aspheric outer surface is convex.

7. The head-up display assembly of claim 6, wherein the first aspheric outer surface faces the printed circuit board.

8. The head-up display assembly of claim 7, wherein the second aspheric outer surface faces the display.

9. The head-up display assembly of claim 1, wherein each one of the plurality of biconic lenses includes four aspheric radii.

10. The head-up display assembly of claim 1, further comprising a diffuser between the biconic lens array and the display.

11. The head-up display assembly of claim 1, wherein the display includes a liquid-crystal display.

12. The head-up display assembly of claim 1, wherein the plurality of light emitting elements are light emitting diodes.

13. The head-up display assembly of claim 1, wherein the printed circuit board defines openings or slots configured to receive locators of a frame about the biconic lens array for aligning each one of the plurality of biconic lenses with a different one of the plurality of light emitting elements.

14. A head-up display assembly comprising:
a printed circuit board including a plurality of light emitting elements;
a display illuminated by the plurality of light emitting elements; and
a biconic lens array between the printed circuit board and the display, the biconic lens array including a plurality of biconic lenses, each one of the plurality of biconic lenses is aligned with a different one of the plurality of light emitting elements, light emitted by the plurality of light emitting elements passes through the plurality of biconic lenses and illuminates the display;
wherein each one of the plurality of biconic lenses includes:
a first aspheric portion including a first outer convex surface facing the printed circuit board;
a second aspheric portion including a second outer convex surface facing the display; and
a hollow core between the first aspheric portion and the second aspheric portion.

15. The head-up display assembly of claim 14, wherein the first aspheric portion has a maximum thickness that is thinner than a maximum thickness of the second aspheric portion.

16. The head-up display assembly of claim 14, wherein the first outer convex surface has a first radius of curvature that is greater than a second radius of curvature of the second outer convex surface.

17. The head-up display assembly of claim 14, wherein each one of the plurality of biconic lenses includes four aspheric radii.

18. The head-up display assembly of claim 14, further comprising a diffuser between the biconic lens array and the display.

19. The head-up display assembly of claim 14, wherein the plurality of biconic lenses are rectangular.

20. A head-up display assembly comprising:
a printed circuit board including a plurality of light emitting elements;
a display illuminated by the plurality of light emitting elements; and
a biconic lens array between the printed circuit board and the display, the biconic lens array including a plurality of biconic lenses, each one of the plurality of biconic lenses is aligned with a different one of the plurality of light emitting elements, light emitted by the plurality of light emitting elements passes through the plurality of biconic lenses and illuminates the display;
wherein each one of the plurality of biconic lenses includes four aspheric radii.

* * * * *

UNITED STATES PATENT AND TRADEMARK OFFICE
CERTIFICATE OF CORRECTION

PATENT NO. : 11,340,496 B2
APPLICATION NO. : 16/913028
DATED : May 24, 2022
INVENTOR(S) : Olga Adeyshvili et al.

It is certified that error appears in the above-identified patent and that said Letters Patent is hereby corrected as shown below:

On the Title Page

Item (73) Assignees, Line 3: Delete "Kariya" and insert --Kariya-city, Aichi-pref.-- therefor Signed and Sealed this
Nineteenth Day of July, 2022

Katherine Kelly Vidal
*Director of the United States Patent and Trademark Office*